US008855832B2

(12) United States Patent
Rees

(10) Patent No.: US 8,855,832 B2
(45) Date of Patent: Oct. 7, 2014

(54) RATE BASED POWER MANAGEMENT DEVICE

(75) Inventor: Kyle Rees, Toronto (CA)

(73) Assignee: Renewable Environmental Energy Service Inc., Toronto, Ontario, CA (US)

(*) Notice: Subject to any disclaimer, the term of this patent is extended or adjusted under 35 U.S.C. 154(b) by 90 days.

(21) Appl. No.: 13/480,547

(22) Filed: May 25, 2012

(65) Prior Publication Data
US 2013/0274942 A1 Oct. 17, 2013

(30) Foreign Application Priority Data
Apr. 17, 2012 (CA) .................................. 2774407

(51) Int. Cl.
G05D 17/00 (2006.01)
G05B 13/00 (2006.01)
G06F 3/041 (2006.01)

(52) U.S. Cl.
USPC ............ 700/295; 345/173; 700/276; 700/297

(58) Field of Classification Search
None
See application file for complete search history.

(56) References Cited

U.S. PATENT DOCUMENTS

| 4,337,401 | A | * | 6/1982 | Olson .............................. 307/39 |
| 4,567,557 | A | * | 1/1986 | Burns ............................ 700/16 |
| 4,998,024 | A | | 3/1991 | Kirk et al. |
| 5,430,430 | A | | 7/1995 | Gilbert |
| 5,481,140 | A | | 1/1996 | Maruyama et al. |
| 5,544,036 | A | | 8/1996 | Brown, Jr. et al. |
| 5,598,349 | A | | 1/1997 | Elliason et al. |
| 6,167,389 | A | | 12/2000 | Davis et al. |
| 6,181,985 | B1 | * | 1/2001 | O'Donnell et al. ............ 700/295 |
| 6,356,426 | B1 | * | 3/2002 | Dougherty .................... 361/102 |
| 6,522,955 | B1 | * | 2/2003 | Colborn ........................ 700/286 |
| 6,828,695 | B1 | * | 12/2004 | Hansen .......................... 307/31 |
| 6,891,478 | B2 | * | 5/2005 | Gardner ........................ 340/635 |
| 7,043,380 | B2 | * | 5/2006 | Rodenberg et al. ............. 702/62 |
| 7,054,414 | B2 | * | 5/2006 | Bergman et al. ................ 379/37 |
| 7,110,832 | B2 | | 9/2006 | Ghent |
| 7,427,927 | B2 | | 9/2008 | Borleske et al. |
| 7,561,977 | B2 | | 7/2009 | Horst et al. |
| 7,586,420 | B2 | * | 9/2009 | Fischer et al. ................ 340/635 |
| 7,705,484 | B2 | | 4/2010 | Horst |
| 7,765,035 | B2 | | 7/2010 | Rodgers |
| 7,782,021 | B2 | | 8/2010 | Kelty et al. |
| 7,792,613 | B2 | | 9/2010 | Kressner et al. |
| 7,821,156 | B2 | | 10/2010 | Katz et al. |

(Continued)

FOREIGN PATENT DOCUMENTS

| EP | 1729223 | 12/2006 |
| WO | WO 2007/136456 | 11/2007 |
| WO | WO 2010/031018 | 3/2010 |

Primary Examiner — Sean Shechtman
Assistant Examiner — Thomas Stevens
(74) Attorney, Agent, or Firm — Kagan Binder, PLLC

(57) ABSTRACT

The present invention is a power management device for connecting a power consuming device to a power source so that the device switches the connection on and off automatically based on the power rate (price per kilowatt-hour) obtained from the power supplier. The user may specify a power usage specification, such as a maximum power rate that the user is willing to pay, and then the device disconnects the power from the power consuming device whenever the power rate is greater than the maximum power rate, and turns it on again when the power rate becomes less than or equal to the maximum power rate. The device includes a programmable controller, wireless and ethernet interfaces and can also act as a wireless access point.

19 Claims, 1 Drawing Sheet

(56) References Cited

U.S. PATENT DOCUMENTS

| | | | |
|---|---|---|---|
| 2002/0024332 A1* | 2/2002 | Gardner | 324/103 R |
| 2002/0163430 A1* | 11/2002 | Bergman et al. | 340/531 |
| 2002/0163997 A1* | 11/2002 | Bergman et al. | 379/37 |
| 2003/0177169 A1* | 9/2003 | Nutt et al. | 709/201 |
| 2004/0061616 A1* | 4/2004 | Fischer et al. | 340/657 |
| 2004/0133314 A1 | 7/2004 | Ehlers et al. | |
| 2006/0154642 A1* | 7/2006 | Scannell, Jr. | 455/404.1 |
| 2008/0272934 A1 | 11/2008 | Wang et al. | |
| 2009/0184689 A1* | 7/2009 | Kressner et al. | 320/162 |
| 2009/0309756 A1 | 12/2009 | Mason, Jr. et al. | |
| 2010/0088970 A1* | 4/2010 | Miller | 52/1 |
| 2010/0145542 A1* | 6/2010 | Chapel et al. | 700/295 |
| 2010/0191487 A1* | 7/2010 | Rada et al. | 702/60 |
| 2010/0198713 A1 | 8/2010 | Forbes, Jr. et al. | |
| 2012/0223675 A1* | 9/2012 | Bianco | 320/109 |
| 2012/0274219 A1* | 11/2012 | Woytowitz et al. | 315/152 |

* cited by examiner

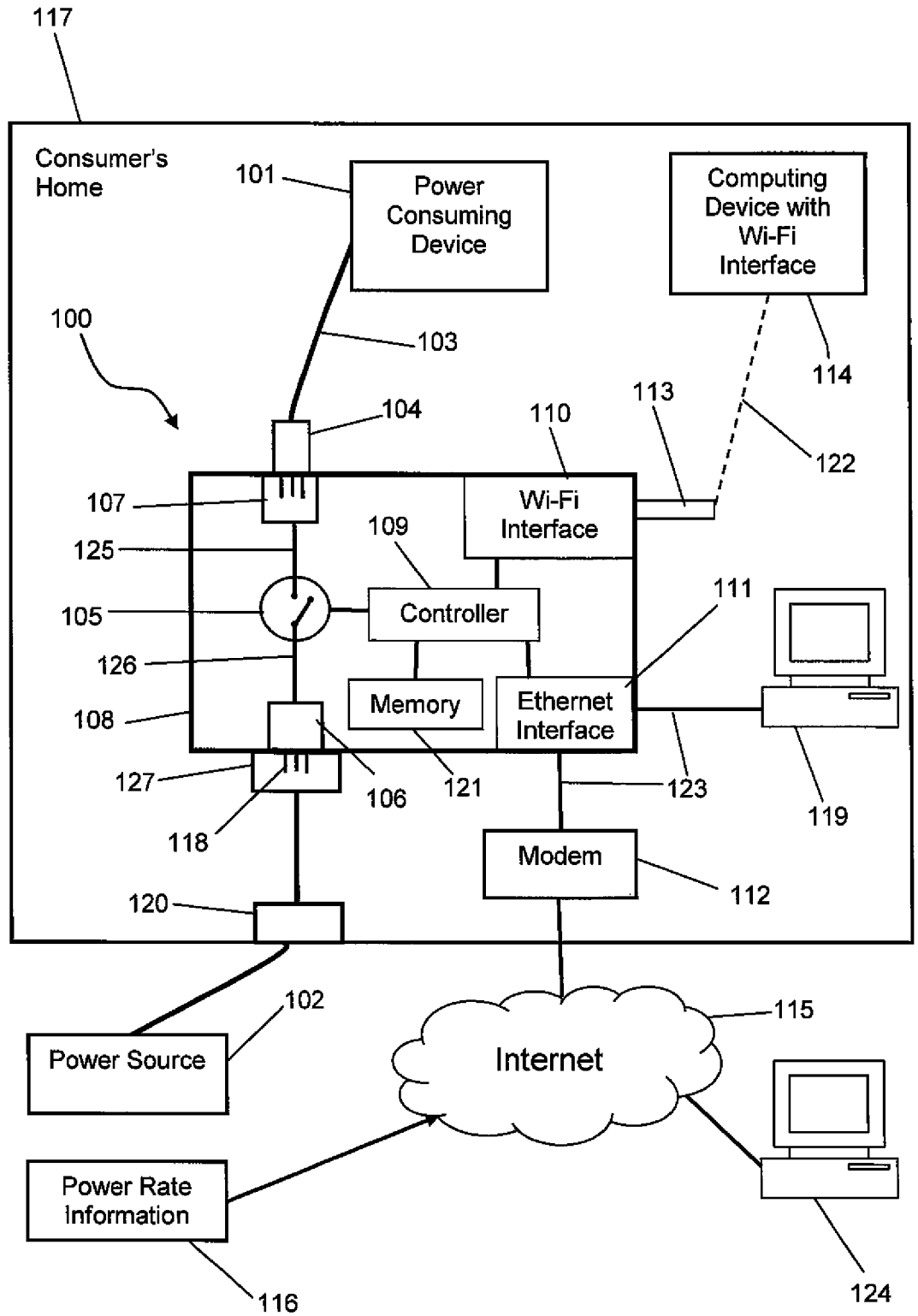

RATE BASED POWER MANAGEMENT DEVICE

FIELD OF THE INVENTION

The present invention relates generally to power management devices adapted to connect power consuming devices to power sources, and more particularly to switches adapted to connect power consuming devices to power sources where power is switched on and off automatically based on the cost of power.

BACKGROUND OF THE INVENTION

Many state and provincial governments in North America and Europe have mandated sliding scale electrical energy rates or electrical rates that change based on the time of day. Smart meters are tools used to implement this type of "time of use" pricing. Utilities can track individual consumer energy use, for example, on 15 minute intervals and charge energy prices based on the time of use.

The electrical markets are generally monitored or priced by a government body independent from the local distribution companies (LDCs). These government bodies are referred to as Independent Electric System Operators (IESOs). The IESO is charged with buying and selling electrical energy at hourly spot prices. Energy prices can fluctuate dramatically. These fluctuations can be caused by a number of factors, such as weather, supply, demand, type of supply, etc. As energy is purchased from generators and sold to utilities, consumers are exposed to open markets where price fluctuation exposes them to the risk of consuming high amounts of energy when energy prices are high. Exposure to high energy prices is avoidable if consumers have access to hourly market energy price data and can make educated decisions when to consume or when not to.

An IESO buys electricity from energy generators and sells electricity to LDCs for consumers to purchase. Market operators publish prices for utilities and consumers to view on the web or internet. This data is used by energy market retailers and LDCs to provide real time energy hourly pricing. Hourly pricing is generally provided in a graphical form may be provided in simple line by line script and downloadable text.

Many consumer appliances and devices require electricity either to store in a battery in which case the consumer may not care at what time the electricity is received. For example, an electric or hybrid plug-in vehicle may require some number of kilowatt-hours of charging within a given period, such as 10 kilowatt-hours within a 24 hour period when the vehicle is not in use but can be connected to a power source. With a 1.5 kW, 120 volt supply, this may require about 7 hours out of the 24 hour window. However, if the user plugs the vehicle in when he parks it, that may happen to coincide with a high-cost time for using power, so the user may prefer to not have charging begin until later when the electricity cost is lower. However, it is difficult and inconvenient for a user to obtain and use such information.

The same consideration applies to other devices or appliances that need to operate for a certain amount of time within a larger time window, such as a clothes washer or dryer.

SUMMARY OF THE INVENTION

It is an object of the invention to provide a power management device that can automatically switch the power to a power consuming device on and off according to a power usage specification provided by a user, where the power usage specification allows the user to specify a maximum power rate (cost per kilowatt-hour) that the user is willing to pay for.

It is a further objective of the invention to provide the aforementioned capability in a relatively small and light package that can be plugged directly into a standard household power outlet, and also act as a wireless access point.

The present invention provides a power management device for connecting a power consuming device to a power source, the power source providing electrical power at a cost determined by a power rate, the power rate varying over time, and the power rate being available via a power rate signal, the power management device comprising:
- (a) a power output adapted to electrically connect to the power consuming device;
- (b) a power input adapted to electrically connect to the power source;
- (c) a current relay switchably connecting the power input to the power output, the relay comprising a power flow switch having on and off states, wherein power flows from the power source to the power consuming device when the power flow switch is in the on state, and no power flows from the power source to the power consuming device when the power flow switch is in the off state; and
- (d) a controller adapted to receive the power rate via the power rate signal, the controller being electrically connected to the power flow switch and programmed to switch the power flow switch between the on and off states in accordance with a power usage specification provided by a user.

The power management device may further comprise a wireless interface and an ethernet interface, and the device may be adapted to act as a wireless access point. The controller may further incorporate a web server that provides a user interface accessible to a user via a web browser to permit the user to enter and modify the power usage specification and manage the operation of the device as a wireless access point.

The power management device may further comprise a housing containing and attached to the current relay, the power output, the power input and the controller. The volume of the housing may be less than 500 cubic centimeters, or may be less than 200 cubic centimeters. The power management device may weigh less than 400 grams, or may weigh less than 200 grams. The power input may be rigidly connected to a plug that extends outward from the housing for direct connection to a standard electrical outlet without the use of a cord, although a cord may optionally be used.

The power usage specification may comprise a maximum power rate, so that the controller maintains the power flow switch in the off state when the power rate exceeds the maximum power rate, and the controller maintains the power flow switch in the on state when the power rate is less than or equal to the maximum power rate.

The power rate signal may comprise digital data that is made available over the internet, and may be made available on a web page.

The power usage specification may comprise a maximum power rate, and the controller may maintain the power flow switch in the off state when the power rate exceeds the maximum power rate, and provide a control interface to accept an external control signal specifying whether to turn the power on or off when the power rate is less than or equal to the maximum power rate, wherein the controller maintains the power flow switch in the on state when the power rate is less than or equal to the maximum power rate and the external signal specifies turning the power on, and maintains the power flow switch in the off state when the power rate is less than or equal to the maximum power rate and the external signal specifies turning the power off. The control interface may be an internet interface and the control signal may be provided over the internet.

The controller may comprise a web server that provides a user interface accessible to a user via a web browser to permit the user to enter and modify the power usage specification. The power management device may further comprise a wireless interface, and the user interface may be provided via the wireless interface. The wireless interface may comprise a Wi-Fi interface. The power management device may be adapted to act as a wireless access point that provides network access via Wi-Fi.

The power management device may also include a master switch having on and off positions, wherein, when the master switch is in the off position, the power flow switch is maintained in the on position, modifying the power usage specification, so that power can flow from the power source to the power consuming device.

The power usage specification may comprise a schedule specifying a maximum power rate as a function of time, so that, at each point in time covered by the schedule, the controller maintains the power flow switch in the off state when the power rate exceeds the maximum power rate specified in the schedule for that time, and the controller maintains the power flow switch in the on state when the power rate is less than or equal to the maximum power rate specified in the schedule for that time.

The power usage specification may comprise upper and lower maximum power rates, the upper maximum power rate being greater than the lower maximum power rate, and (a) when the power flow switch is in the on state, the power rate is less than or equal to the upper maximum power rate, and the power rate increases to more than the upper maximum power rate, then the controller switches the power flow switch into the off state, and (b) when the power flow switch is in the off state, the power rate is greater than the lower maximum power rate, and the power rate decreases to less than or equal to the lower maximum power rate, then the controller switches the power flow switch into the on state. The power flow switch may be initially in the on state if the power rate is initially less than or equal to the upper maximum power rate, and otherwise initially in the off state.

BRIEF DESCRIPTION OF THE DRAWINGS

FIG. 1 is a functional block diagram showing the main functional components of an embodiment of the power management device connected to a power source and a power consuming device.

DETAILED DESCRIPTION OF THE INVENTION

One embodiment of the invention is shown in FIG. 1. A power management device 100 is depicted as it may be deployed within a consumer's home 117 or garage. The components of the power management device 100 are contained within a housing 108 that may, for example, be formed from injection moulded plastic. The major components of the power management device 100, which are depicted in FIG. 1, are the controller 109, the power input 106, the power output 107, the power flow switch 105, a Wi-Fi interface 110, an ethernet interface 111 and computer readable memory 121. The power flow switch 105 and electrical lines 125, 126, which are connected between the power flow switch 105 and the power output 107 and between the power flow switch 105 and the power input 106, form a high current relay switchably connecting the power input 106 and the power output 107. A small Wi-Fi antenna 113 is attached to the Wi-Fi interface 110 for receiving and sending Wi-Fi signals. Other necessary elements, such as a power supply to supply DC current at suitable voltages to the components of the power management device 100 are not shown in FIG. 1.

The power output 107 provides a connector, such as a standard three prong female receptacle where the three openings are open to the outside of the housing 108 so that they can receive an electrical plug 104, such as a standard three prong male electrical plug that is connected to or part of a power consuming device 101, such as an electric car or a household appliance. Such a plug 104 is typically attached to the power consuming device 101 by a cord 103 containing electrical conductors to electrically connect the power output 107 to the power consuming device 101.

The power input 106 may provide a connector 118, such as a standard three prong male electrical connector (or "plug") that can be plugged directly into a standard household electrical outlet 127, such as a 120 or 230 volt outlet, to electrically connect the power input 106 to a power source 102. The power source 102 is typically provided by an LDC. The outlet 127 is typically connected to a circuit breaker box 120 that received power from the power source 102. The power management device 100 is light and small enough, as discussed below, that it can thereby be rigidly connected to an electrical outlet by, for example, a plug comprising three prongs 118 extending from one side of the housing 108 and rigidly attached to the housing 108. The power management device 100 may be adapted to work with standard mains AC power systems, which generally have supply voltages in range of 100-240 volts with a frequency of 50 or 60 Hz.

The power flow switch 105 has electrically switchable on and off states such that, when the power flow switch 105 is in the on state, power can flow from the power source 102 to the power consuming device 101 through the high current relay in the power management device 100, and when the power flow switch 105 is in the off state, no power can flow from the power source 102 to the power consuming device 101. The power flow switch 105 is electrically switchable under control of the controller 109.

The controller 109 is generally a software programmable microprocessor that is connected to a computer readable memory 121, an ethernet interface 111, and a Wi-Fi interface 110, in addition to being electrically connected to the power flow switch 105 so that the controller 109 can control the state of the switch 105. The memory 121 includes non-volatile memory, such as an EPROM, for storing software and fixed data, and preferably includes writable non-volatile memory for storing configuration information and power rate information. In some embodiments, the computer readable memory may be contained within the controller 109, as may the interfaces.

The power management device 100 is connected to the internet 115 by a modem 112, which is typically connected to the power management device 100 via category 5 cable using RJ-45 connectors, one end of which plugs into a female RJ-45 jack open to the outside of the housing 108 provided by the ethernet interface 111. The power management device 100 may also connect to local computing devices 119 using the same type of cable, or it may connect to local computing devices having a Wi-Fi interface 114 (or other wireless interface) via a Wi-Fi signal 122 (or other wireless signal). The power management device 100 may also connect to remote computing devices 124 via the internet 115.

Software running on the controller 109 implements a user interface, a power rate information 116 interface, wireless access point functionality, and a switch controller.

The power source provider makes power rate information 116 available via a power rate signal. In the depicted embodiment, the power rate signal comprises digital data provided via the internet 115. This may be provided, for example, on a website associated with the power source provider. This may state the current power rate or a power rate schedule giving the power rate as a function of time. The power rate is the cost of power, typically specified in cents per kilowatt-hour. The current power rate may be updated periodically, such as once per hour. More frequent, and even continuous, updating of the current power rate is also possible.

The controller software is adapted to check the power rate periodically or on demand. For example, it may be configured to check the power rate every hour, or every five minutes. The user interface may allow the user to instruct the controller software to check the power rate immediately. The current power rate (most recently obtained by the controller) may be displayed to the user via the user interface. Alternatively, the provider or IESO may make the power rate available via a push enabled web application, such as by using HTTP server push, to send the power rate to the controller whenever it changes.

The user interface is preferably provided by a web server that is part of the controller software, so that a user on a computing device can access the user interface using a standard web browser, such as Mozilla™ Firefox™ or Google™ Chrome™, by entering the power management device's IP address into the browser's location bar, similarly as with the user interface provided by typical routers. The user interface allows the user to enter and edit a power usage specification, which the controller 109 stores in non-volatile memory 121. A power usage specification may take various forms. Typically it includes at least a maximum power rate, which might, for example, set to be 7.3 cents per kilowatt-hour.

The main screen presented by the user interface software may, for example, include:
- power management device IP address (defaulted to, e.g., 192.168.1.4);
- radio button for DHCP or static IP (if static is selected there is a window to enter the IP);
- button to look for Wi-Fi access point;
- wireless password;
- signal strength of Wi-Fi;
- current time of day;
- drop down list of Independent Electric System Operators (IESOs);
- web page window showing internet address of the IESO;
- test button to bring down the current power rate;
- a drop down to select how often the power management device should check the current power rate;
- a window showing the current power rate (market price) most recently obtained;
- a price selection window where the user can enter the maximum power rate;
- a radio button to select whether the user wants the power management device to act as a wireless access point; and
- an LDC mode radio button.

The user interface may be adapted for use via a mobile browser running on a mobile computing device, which may be a tablet or smart phone, such as an iPhone™, an iPad™, a Galaxy™ Nexus™, a BlackBerry™ Curve™, or an HTC™ Rezound™ so that the user of such a device can control the power management device 100 using the mobile browser on the mobile computing device. Alternatively, a mobile app may be provided for specific mobile computing devices to allow the user of the mobile computing device to control the power management device 100. A Wi-Fi enabled mobile computing device could then act as a local computing device with Wi-Fi interface 114, as shown in FIG. 1, and an internet enabled mobile computing device (e.g. using a 3G or 4G wireless network) could act as a remote computing device 124 via the internet 115.

The switch controller implemented in the software running on the controller 109 reads the power usage specification and switches the power flow switch 105 between the on and off states in accordance with the power usage specification. When the power usage specification comprises a maximum power rate, the switch controller may maintain the power flow switch in the off state when the power rate exceeds the maximum power rate, and maintain the power flow switch in the on state when the power rate is less than or equal to the maximum power rate. Thus, if the current power rate is less than or equal to the maximum power rate, so that the switch 105 is in the on state, and the software receives an updated power rate that is greater than the maximum power rate, then the switch controller switches the power flow switch 105 into the off state. The switch 105 then remains in the off state until an updated power rate is received via the power rate signal that is less than or equal to the maximum power rate, following which the switch controller switches the power flow switch 105 into the on state and keeps it there unless and until the power rate again exceeds the maximum power rate.

When the power management device 100 is powered up, the software is loaded from the non-volatile computer readable memory 121 and starts to run on the controller 109. Then when a user connects to the power management device 100 by entering its address into a browser, the software presents an interface that allows the user to set up the power management device 100. The user usually needs to specify the local Wi-Fi network name and password (if any). The user also needs to specify the user's power supplier or the internet address of the power rate information 116. The user interface may permit this to be done by presenting a pre-stored list of IESOs, for each of which the power management device 100 has an internet address for obtaining power rates, and allowing the user to select one. The user may then click a button presented by the user interface to retrieve the current power rate in order to check that the power management device 100 is properly configured.

The power management device 100 may also include software running on the controller 109 to control the wireless interface so as to provide the capability for the power management device 100 to act as a wireless access point. A browser-based user interface is also employed to manage the wireless access point capabilities.

The power management device 100 may also allow remote control by a remote computing device 124 over the internet. This could be, for example, a user's PC at the user's workplace which has a web browser installed, or a wireless device, as discussed above.

The power management device 100 may also support an "LDC mode" in which the power management device 100 has a control interface to receive an external control signal specifying whether to turn the power on or off when the power rate is less than or equal to the maximum power rate. The external control signal, which may be provided by the LDC, has no effect when the power rate is greater than the maximum power rate. When the power rate is less than or equal to the maximum power rate, the controller maintains the power flow switch in the on state when the external signal specifies turning the power on, and maintains the power flow switch in the off state when the external signal specifies turning the power off. The control interface may be an internet interface and the control signal may be provided over the internet in some embodiments.

The power management device 100 may also have a master switch (not shown in FIG. 1) to control its operation. The master switch is a manual switch accessible through the housing that a user can physically switch between on and off positions. When the master switch is in the off position, the power flow switch 105 is maintained in the on position so that power can flow from the power source 102 to the power consuming device 101 just as if the power consuming device 101 were plugged directly into a power outlet 127. When the master switch is in the on position, the software on the controller 109 works as described above to switch the power flow switch between the on and off states in accordance with the power usage specification. In the off position, the master switch effectively overrides or modifies the user-entered power usage specification.

The power management device 100 may also incorporate coloured lights or LEDs (not shown in FIG. 1) to provide status information to the user without the need to use a computing device. For example, a blue LED may be illuminated when the device is connected to the internet. When the master switch is in the on position and the device has connected to the IESO web page and started tracking the power rate, and the power rate is less than or equal to the specified maximum, the power flow switch is switched into the on state to allow power to flow to the power consuming device, and a green LED may be illuminated. If it cannot find the site, or access the power rate, the controller may cause the greed LED to flash on and off periodically to alert the user that there is a problem. When the power rate exceeds the maximum power rate, the power flow switch is switched into the off state and a red LED may be illuminated.

The components of the power management device 100 are largely standard semiconductor chips and simple electrical parts that can be contained in a small housing 108 so that the power management device 100 is relatively light and easily held and manipulated by a person's hand. Typically the housing is less than 1000 cubic centimeters, preferably less than 500 cubic centimeters, and more preferably less than 200 cubic centimeters. For example, the housing may be less than or equal to 8 cm long, 6 cm wide and 4 cm deep, for a total volume of less than or equal to 192 cubic centimeters. The weight of the fully assembled power management device 100 is typically less than 800 grams, preferably less than 400 grams, and more preferably less than 250 grams.

When the power rate information 116 varies frequently or continuously and the power usage specification is based only on a maximum power rate, the power management device 100 may be configured via the user interface to check the power rate less frequently than the information is updated. For example, it may be set to check the power rate once every five minutes. This prevents rapid switching between the on and off states in the case that the power rate happens to fluctuate about the specified maximum power rate.

Alternatively, a more sophisticated power usage specification employing hysteresis may be used, by having an upper maximum power rate and a lower maximum power rate, the upper maximum power rate being greater than the lower maximum power rate. The user may set both numbers, or could, for example, set only the upper maximum power rate and configure the power management device 100 to run in hysteresis mode so that the controller software sets the lower maximum power rate to, for example, 10% less than the upper maximum power rate. The power flow switch may be placed initially in the on state if the power rate is initially less than or equal to the upper maximum power rate, and otherwise initially in the off state. Then, when the power flow switch is in the on state, the power rate is less than or equal to the upper maximum power rate, and the power rate increases to more than the upper maximum power rate, then the controller switches the power flow switch into the off state, and when the power flow switch is in the off state, the power rate is greater than the lower maximum power rate, and the power rate decreases to less than or equal to the lower maximum power rate, then the controller switches the power flow switch into the on state.

The power usage specification may include a schedule specifying a maximum power rate as a function of time, so that, at each point in time covered by the schedule, the controller software maintains the power flow switch 105 in the off state when the power rate exceeds the maximum power rate specified in the schedule for that time, and the controller maintains the power flow switch 105 in the on state when the power rate is less than or equal to the maximum power rate specified in the schedule for that time.

The power usage specification may also, or alternatively, allow the user to specify a maximum total cost of power to be used in a specified time period, or to specify a total desired amount of power to be drawn by the power consuming device within a specified time frame. In the latter case, the user may also be permitted to specify that the power management device 100 should determine an optimal maximum power rate. In this case, controller software may store and use historical power rate schedules containing, for example, the average power rate at each time during a day over the last month, for each day of the week, with holidays being stored separately. Then the software can calculate the lowest maximum power rate that historically would have provided the specified amount of power in the specified time frame, and possibly add some small percentage to help ensure that the specified amount of power is provided in case the power rate is higher than the historical averages that day. The software may also monitor the usage during the specified period and adaptively increase the maximum power rate if less power than predicted has flowed to the power consuming device at particular point in time during the specified charging period.

A wireless access point is a device that allows wireless devices to connect to a wired network using wireless protocols such as Wi-Fi and Bluetooth. In the current invention, the device may be adapted to act as a wireless access point by software running on the controller 109 that manages the Wi-Fi interface 110 (typically IEEE 802.11a/b/g/n compliant) and ethernet (IEEE 802.3) interface 111 and provides a user interface, generally via an HTTP server, for configuring and managing the wireless access point capabilities. Such capabilities and the software required to implement them are well known to skilled persons and, although their use in a device for power management is novel, it would be clear to a skilled person how to implement such capabilities using the components of the embodiment of the power management device 100 as shown in FIG. 1.

Generally, a computer, computer system, computing device, client or server, as will be well understood by a person skilled in the art, includes one or more computer processors, and may include separate memory, and one or more input and/or output (I/O) devices (or peripherals) that are in electronic communication with the one or more processor(s). The electronic communication may be facilitated by, for example, one or more busses, or other wired or wireless connections. In the case of multiple processors, the processors may be tightly coupled, e.g. by high-speed busses, or loosely coupled, e.g. by being connected by a wide-area network.

A computer processor, or just "processor", is a hardware device for performing digital computations. A programmable processor is adapted to execute software, which is typically stored in a computer-readable memory. Processors are generally semiconductor based microprocessors, in the form of microchips or chip sets. Processors may alternatively be completely implemented in hardware, with hard-wired functionality, or in a hybrid device, such as field-programmable gate arrays or programmable logic arrays. Processors may be general-purpose or special-purpose off-the-shelf commercial products, or customized application-specific integrated circuits (ASICs). Unless otherwise stated, or required in the context, any reference to software running on a programmable processor shall be understood to include purpose-built hardware that implements all the stated software functions completely in hardware.

Computer-readable memory, which may also be referred to as a computer-readable medium or a computer-readable storage medium, which terms have identical meanings herein, can include any one or a combination of non-transitory, tangible memory elements, such as random access memory (RAM), which may be DRAM, SRAM, SDRAM, etc., and nonvolatile memory elements, such as a ROM, PROM, FPROM, OTP NVM, EPROM, EEPROM, hard disk drive, solid state disk, magnetic tape, CDROM, DVD, etc.). Memory may employ electronic, magnetic, optical, and/or other technologies, but excludes transitory propagating signals so that all references to computer-readable memory exclude transitory propagating signals. Memory may be distributed such that at least two components are remote from one another, but are still all accessible by one or more processors. A nonvolatile computer-readable memory refers to a computer-readable memory that can retain information stored in the memory when it is not powered. A computer-readable memory is a physical, tangible object that is a composition of matter. The storage of data, which may be computer instructions, or software, in a computer-readable memory physically transforms that computer-readable memory by physically modifying it to store the data or software that can later be read and used to cause a processor to perform the functions specified by the software or to otherwise make the data available for use by the processor. It is the express intent of the inventor that in any claim to a computer-readable memory, the computer-readable memory, being a physical object that has been transformed to record the elements recited as being stored thereon, is an essential element of the claim.

Software may include one or more separate computer programs configured to provide a sequence, or a plurality of sequences, of instructions to the processors to cause the processors to perform computations, control other devices, receive input, send output, etc.

It is intended that the invention includes computer-readable memory containing any or all of the software described herein. In particular, the invention includes such software stored on non-volatile computer-readable memory that may be used to distribute or sell the invention or parts thereof.

It should be emphasized that the above-described embodiments of the present invention, particularly, any "preferred" embodiments, are possible examples of implementations, merely set forth for a clear understanding of the principles of the invention. Many variations and modifications may be made to the above-described embodiment(s) of the invention as will be evident to those skilled in the art.

Where, in this document, a list of items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or other similar expressions, is in no way intended to imply that a list is exhaustive. Unless otherwise expressly stated, such lists shall be read to include all comparable or equivalent variations of the items, and alternatives to the items, in the list that a skilled person would understand would be suitable for the purpose that the items are listed.

The words "comprises" and "comprising", when used in this specification and the claims, are to used to specify the presence of stated features, elements, integers, steps or components, and do not preclude, nor imply the necessity for, the presence or addition of one or more other features, elements, integers, steps, components or groups thereof.

The scope of the claims that follow is not limited by the embodiments set forth in the description. The claims should be given the broadest purposive construction consistent with the description as a whole.

What is claimed is:

1. A power management device for connecting a power consuming device to a power source, the power source providing electrical power at a cost determined by a power rate, the power rate varying over time, and the power rate being available via a power rate signal, the power management device comprising:
    (a) a power output adapted to electrically connect to the power consuming device;
    (b) a power input adapted to electrically connect to the power source;
    (c) a current relay switchably connecting the power input to the power output, the relay comprising a power flow switch having on and off states, wherein power flows from the power source to the power consuming device when the power flow switch is in the on state, and no power flows from the power source to the power consuming device when the power flow switch is in the off state; and
    (d) a controller adapted to receive the power rate via the power rate signal, the controller being electrically connected to the power flow switch and programmed to switch the power flow switch between the on and off states in accordance with a power usage specification provided by a user,
    wherein the power usage specification comprises a maximum power rate, and the controller maintains the power flow switch in the off state when the power rate exceeds the maximum power rate, and provides a control interface to accept an external control signal specifying whether to turn the power on or off when the power rate is less than or equal to the maximum power rate, wherein the controller maintains the power flow switch in the on state when the power rate is less than or equal to the maximum power rate and the external signal specifies turning the power on, and maintains the power flow switch in the off state when the power rate is less than or equal to the maximum power rate and the external signal specifies turning the power off.

2. The power management device of claim 1 in which the power management device further comprises a wireless interface and an ethernet interface, and the power management device is adapted to act as a wireless access point.

3. The power management device of claim 1, further comprising a housing containing and attached to the current relay, the power output, the power input and the controller.

4. The power management device of claim 3 in which the housing has a volume of less than 500 cubic centimeters.

5. The power management device of claim 4 in which the volume of the housing is less than 200 cubic centimeters.

6. The power management device of claim 4 in which the weight of the power management device weighs less than 400 grams.

7. The power management device of claim 5 in which the weight of the power management device weighs less than 250 grams.

8. The power management device of claim 5 in which the power input is rigidly connected to a plug that extends outward from the housing for direct connection to a standard electrical outlet without the use of a cord.

9. The power management device of claim 1 in which the power usage specification comprises a maximum power rate, and the controller maintains the power flow switch in the off state when the power rate exceeds the maximum power rate, and the controller maintains the power flow switch in the on state when the power rate is less than or equal to the maximum power rate.

10. The power management device of claim 1 in which the power rate signal comprises digital data that is made available over the Internet.

11. The power management device of claim 10 in which the power rate is made available on a web page.

12. The power management device of claim 1 in which the control interface is an Internet interface and the control signal is provided over the Internet.

13. The power management device of claim 1 in which the controller comprises a web server that provides a user interface accessible to a user via a web browser to permit the user to enter and modify the power usage specification.

14. The power management device of claim 13 in which the power management device further comprises a wireless interface, and the user interface is provided via the wireless interface.

15. The power management device of claim 14 in which the power management device is adapted to act as a wireless access point that provides network access via Wi-Fi.

16. The power management device of claim 2 in which the controller comprises a web server that provides a user interface accessible to a user via a web browser to permit the user to enter and modify the power usage specification and manage the operation of the power management device as a wireless access point.

17. The power management device of claim 3 further comprising a master switch having on and off positions, wherein, when the master switch is in the off position, the power flow switch is maintained in the on position, modifying the power usage specification, so that power can flow from the power source to the power consuming device.

18. The power management device of claim 1 in which the power usage specification comprises a schedule specifying a maximum power rate as a function of time, so that, at each point in time covered by the schedule, the controller maintains the power flow switch in the off state when the power rate exceeds the maximum power rate specified in the schedule for that time, and the controller maintains the power flow switch in the on state when the power rate is less than or equal to the maximum power rate specified in the schedule for that time.

19. A power management device for connecting a power consuming device to a power source, the power source providing electrical power at a cost determined by a power rate, the power rate varying over time, and the power rate being available via a power rate signal, the power management device comprising:

(a) a power output adapted to electrically connect to the power consuming device;

(b) a power input adapted to electrically connect to the power source;

a current relay switchably connecting the power input to the power output, the relay comprising a power flow switch having on and off states, wherein power flows from the power source to the power consuming device when the power flow switch is in the on state, and no power flows from the power source to the power consuming device when the power flow switch is in the off state; and (d) a controller adapted to receive the power rate via the power rate signal, the controller being electrically connected to the power flow switch and programmed to switch the power flow switch between the on and off states in accordance with a power usage specification provided by a user, wherein the power usage specification comprises upper and lower maximum power rates, the upper maximum power rate being greater than the lower maximum power rate, and wherein the power flow switch is initially in the on state if the power rate is initially less than or equal to the upper maximum power rate, and otherwise is initially in the off state, and (a) when the power flow switch is in the on state, the power rate is less than or equal to the upper maximum power rate, and the power rate increases to more than the upper maximum power rate, then the controller switches the power flow switch into the off state, and (b) when the power flow switch is in the off state, the power rate is greater than the lower maximum power rate, and the power rate decreases to less than or equal to the lower maximum power rate, then the controller switches the power flow switch into the on state.

* * * * *